United States Patent [19]

Neilson

[11] Patent Number: 4,458,183

[45] Date of Patent: Jul. 3, 1984

[54] DC MOTOR CONTROL

[75] Inventor: James M. M. Neilson, Edinburgh, Scotland

[73] Assignee: The University Court of the University of Edinburgh, Edinburgh, Scotland

[21] Appl. No.: 434,616

[22] Filed: Oct. 15, 1982

[30] Foreign Application Priority Data

Oct. 15, 1981 [GB] United Kingdom ................. 8131093

[51] Int. Cl.³ ........................... H02P 5/06; H02P 5/00
[52] U.S. Cl. ................................ 318/139; 318/345 R; 318/341
[58] Field of Search ............... 318/125, 129, 130, 132, 318/134, 139, 345, 341

[56] References Cited

U.S. PATENT DOCUMENTS

| 3,241,023 | 3/1966 | Eby | 318/341 X |
| 3,855,511 | 12/1974 | Smith | 318/341 X |
| 3,912,994 | 10/1975 | Stovall | 318/341 |
| 3,914,671 | 10/1975 | Morton et al. | 318/139 |
| 4,200,832 | 4/1980 | Johansson et al. | 318/139 X |
| 4,211,961 | 7/1980 | Marumoto et al. | 318/341 X |
| 4,381,479 | 4/1983 | Wesling et al. | 318/341 X |

FOREIGN PATENT DOCUMENTS

| 1182429 | 2/1970 | United Kingdom . |
| 1330131 | 9/1973 | United Kingdom . |
| 1425848 | 2/1976 | United Kingdom . |
| 1432832 | 4/1976 | United Kingdom . |
| 1450963 | 9/1976 | United Kingdom . |
| 1486586 | 9/1977 | United Kingdom . |

Primary Examiner—G. Z. Rubinson
Assistant Examiner—Paul Shik Luen Ip
Attorney, Agent, or Firm—Michael J. Striker

[57] ABSTRACT

To reduce battery drain by a DC electric motor (e.g. in the case of an ambulatory monitoring tape recorder) the motor is fed with pulses of current derived from a pulse circuit that includes a differential amplifier monitoring the voltage difference between a first reference voltage that is related to torque load on the motor and a second reference voltage that is derived by adding a sawtooth waveform to a base signal that is proportional to the voltage across the motor.

10 Claims, 5 Drawing Figures

DC MOTOR CONTROL

TECHNICAL FIELD

This invention relates to an improved control system for a DC electric motor and to an improved method of energising a DC electric motor. The invention has particular application to the energisation of miniature permanent magnet DC electric motors which are intended, at least in part, to be powered by a battery. Such motors are employed in portable apparatus such as battery (or mains/battery) powered tape recording and/or replaying apparatus or cameras.

Utilizing the invention permits the electronic control of a DC electric motor so as to reduce the energy consumption in the electronic control circuit by arranging that the control system acts as a 'switched mode regulator' in contrast to the 'linear regulator' circuit usually employed.

One particularly useful application of the invention is in the speed control of miniature electric motors used to drive the tape transport mechanism of portable, battery-operated slow cassette tape recorders used to record electrocardiogram or electroencephalogram signals from subjects carrying the battery-operated tape recorder on their person. In this application, the motor speed may be so slow that the actual motor voltage required is substantially less than the battery voltage available so that in a prior art recorder more power is wasted in the linear electronic control circuit, which absorbs the surplus battery voltage, than is usefully employed in driving the motor.

DISCUSSION OF PRIOR ART

It is known to periodically switch the power to a battery powered DC motor on/off and at least some of these known arrangement do produce some saving in battery drain. U.K. Pat. No. 1,486,586 relates particularly to the problem of reversing the current in order to turn off thyristor chopper devices and is intended for the economical control of large currents using a special resonant circuit approach. U.K. Pat. No. 1,330,131 is directed towards the control of the power dissipated in battery powered vehicle motors by varying the demand signal applied to a "DC switch" supplying current pulses to a series motor at a high repetition frequency. A series field winding and diode supply the motor current between current pulses fed by the "DC switch". The intention is to limit the maximum power applied to the motor to avoid damage-not to conserve battery power. U.K. Pat. No. 1,182,429 relates to the use of a relay whose coils and a resistor are connected in series across a motor so that when the motor reaches the desired speed, the resulting motor volts are enough to operate the relay contacts, disconnecting the whole circuit from the battery. U.K. Pat. No. 1,450,963 is concerned with improved connection arrangements for thyristors used in chopper circuits for the control of high powered loads such as the motors of fork lift trucks. U.K. Pat. No. 1,425,848 is concerned with an electric traction system which uses several switches and inductors and diodes to feed a shunt excited motor armature. If one switch fails (to DC) then others can carry on. U.K. Pat. No. 1,371,854 describes an oscillatory or self oscillatory arrangement of two transistors with +ve feedback to drive pulses into a DC motor which also has a capacitor across it. Continuously variable speed control and quiet operation is claimed. Finally U.K. Pat. No. 1,432,832 describes another thyristor chopper arrangement using a second thyristor to commutate the first with the cooperation of an inductor and a capacitor.

This invention relates to an improved DC motor control system and method which has particular use in effecting a dramatic saving of battery power in the case of an ambulatory monitoring tape recorder.

BRIEF STATEMENT OF INVENTION

According to one aspect of the invention, there is provided a method of energising a DC electric motor having an armature winding and a commutator therefor, which comprises feeding electrical power to a series connection of an inductor and the armature of the motor in unidirectional current pulses at a repetition rate which is large compared to the in-use commutation rate prevailing in the armature winding of the motor, and maintaining current flow in the same direction through said armature winding during the intervals between said pulses, the ratio between the pulse and interval widths being controlled so that the time average voltage applied to the armature winding over many pulses is made equal to the desired motor voltage, which is characterised by the steps of (a) generating an operator-variable first reference voltage, (b) generating a voltage representing at least a proportion of the motor voltage, (c) superimposing on said generated proportion of the motor voltage a waveform having a repetition rate which is at least several hundred times the commutation rate prevailing in the armature winding of the motor and having negative- and positive-going ramps, to produce a second reference voltage, (d) feeding said first and second reference voltages to input terminals of a voltage comparing means, and (e) generating the current pulses fed to the armature winding via an electronic circuit which includes said voltage comparing means, to effect a switching of the current to the motor each time said second reference voltage traverses said first reference voltage.

The waveform is suitably a saw-tooth waveform and can have a frequency of a few tens of kilohertz.

The voltage comparing means is suitably a differential amplifier.

According to a further aspect of the invention a DC motor control system comprises a DC electric motor having an armature winding and a commutator therefor, terminal means for feeding electrical power from a battery connected thereto to the motor, electrical switch means in the power supply from the terminal means to the motor, an inductor in series with the armature winding of the motor in a current loop, means in the loop to maintain current flow therearound when said switch means is open, and a control circuit for said switch means which opens and closes the latter repetitively at a rate which is large compared to the in-use commutation rate prevailing in the armature winding of the motor, which is characterised in that said control circuit includes first means to generate a first reference voltage, second voltage dividing means to generate a base for a second reference voltage which base is proportionally related to the voltage appearing across the motor, a waveform generator generating a waveform having a repetition rate which is at least several hundred times the commutation rate of the motor and both negative- and positive-going ramps, means to add the base to the waveform to generate the second reference voltage, and means to compare the first and second reference voltages and to switch current to the motor when said second reference voltage drops below said first reference voltage.

BRIEF DESCRIPTION OF DRAWINGS

The invention will now be described, by way of example, with reference to the accompanying drawings, in which.

DESCRIPTION OF PREFERRED EMBODIMENTS

Figure 1:
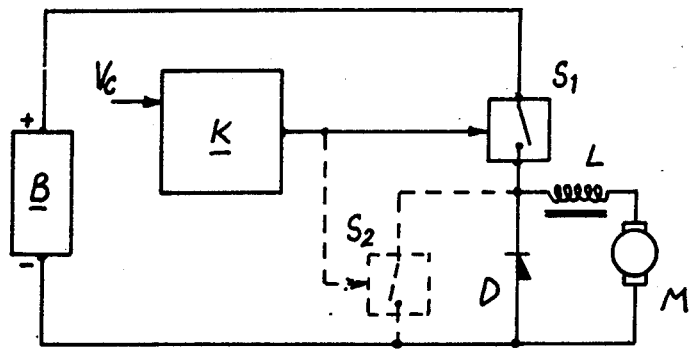
FIG. 1 illustrates the principle of a control system according to the invention.

Referring to FIG. 1, an electronically controlled switch $S_1$ is used to interrupt the power flowing to the armature winding of a permanent magnet DC motor M from a source of supply B (e.g. a battery) which has a voltage somewhat higher than that required by the motor M. The electronic switch $S_1$ is repetitively switched by a control circuit K so that the full supply voltage is applied to the motor M while the switch is ON and no power is supplied from the source B during switch OFF periods. The ratio of 'on' to 'off' periods is controlled by the switch control circuit K so that the time average voltage applied to the motor circuit over many switch operations is made equal to the desired motor voltage. Conveniently the switch $S_1$ is operated at a steady frequency, usually high in comparison with the motor rotation speed, in which case the on/off ratio over a single switch cycle, or any whole number of cycles, determines the average voltage applied to the motor M.

When the switch $S_1$ is closed and the motor current flows through it, the voltage across the terminals of the switch $S_1$ may be relatively small compared with the supply voltage, or the motor voltage, so that comparatively little power is dissipated in the switch $S_1$. When the switch $S_1$ is open during 'off' periods of the switching cycle, no current flows through it and no power is dissipated in the switch $S_1$. Thus relatively little power is wasted in the switch $S_1$ and the power drawn from the supply B is but little more than that actually utilised by the motor M itself. To maintain the motor current throughout the switching cycle, a diode D (or alternatively another electronic switch $S_2$ closed when the switch $S_1$ is opened by the same switch control circuit K), and an inductor L in series with the motor M define a current loop.

The switch control circuit K may take a variety of different forms and preferably cycles the switch(es) on and off at a high frequency (some tens of kilohertz) to allow the use of relatively small values of inductor L to maintain the current during switch 'off' periods. Control of the on/off time ratio of the switch cycle may be achieved by the use of a fixed 'on' duration and varying frequency, or by using a fixed frequency but controlling the duration of the 'on' portion of the cycle, or even by adjustment of both frequency and duration of the 'on' pulses. Typically the switch control circuit K may generate the necessary high frequency stream of switch control pulses in response to a control voltage $V_c$ so that the on/off ratio follows any variation in $V_c$ in accordance with some convenient law. If this control voltage is itself derived by combining some 'reference voltage' with a 'feedback voltage' obtained by combination of voltages derived from motor voltage, speed, current, torque etc., then the speed, torque and other characteristics of the motor operation may be constrained to follow alterations in the reference voltage as desired in the particular application.

Figure 2:
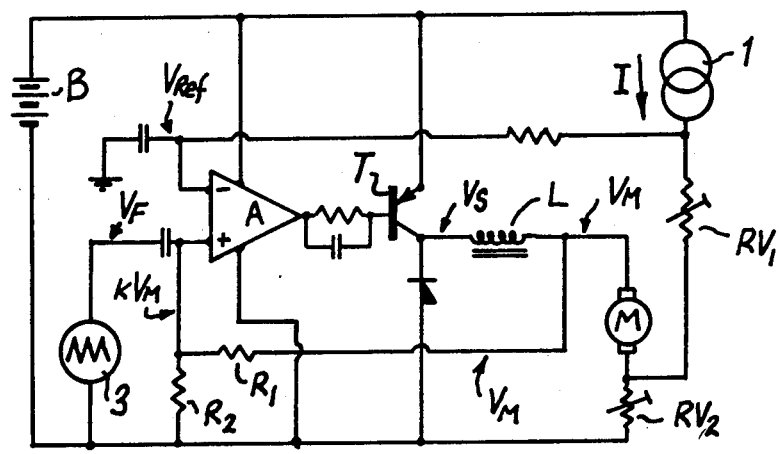
FIG. 2 illustrates, in greater detail one circuit for achieving the method of the invention.
Figure 3A:
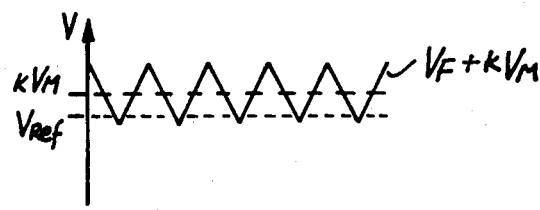
FIGS. 3a and 3b are graphs of signals appearing in the circuit of FIG. 2.
Figure 3B:

FIG. 2 illustrates a typical motor speed control circuit using the invention. A high gain amplifier A acts as a comparator of the voltages appearing at its + and − input terminals. A reference current source 1 passes a DC reference current I through resistors $RV_1$ and $RV_2$ developing a reference voltage $V_{Ref}$ at the −'ve terminal of the amplifier A, which reference voltage is determined mainly by the setting of the 'Speed' control $RV_1$. A fraction $kV_M$ of the (speed dependent) terminal voltage of the motor M is fed back to appear at the +'ve terminal of the amplifier A via a potential divider $R_1$, $R_2$. At the +'ve terminal, the fraction $kV_M$ has added to it a high frequency (e.g. 60 KHz) triangular waveform $V_F$ of about 10 mVpp amplitude derived from a sawtooth generator 3. As shown in FIG. 3a, the 60 KHz triangular waveform $V_F$ causes the input to the amplifier A to oscillate around the mean value $kV_M$, so that in the normal state of the circuit, the negative tips of this waveform just cross the reference voltage level $V_{Ref}$ being maintained at the −'ve input terminal of the amplifier A. Each time $V_F$ crosses $V_{Ref}$, the output of the amplifier A swings rapidly negative and switches ON a switching transistor T (the equivalent of the switch $S_1$ in FIG. 1) (see FIG. 3b). During each ON period, the transistor switch T applies almost the full supply voltage from the battery B to the motor through the inductor L. Any fall in motor speed results in a fall in motor voltage $V_M$ and hence in a lowering of $V_F$ allowing the negative tips of $V_F$ to remain longer below the $V_{Ref}$ level and generating longer 'ON' pulses. The increased 'ON' time raises the mean motor voltage (and speed) restoring the status quo. The circuit shown in FIG. 2 thus acts to maintain a motor speed such that $V_M = 1/k \, V_{Ref}$ so that a constant motor speed proportional to $V_{Ref}$ is achieved. An increase in the torque load on the motor increases the motor current and hence the voltage across $RV_2$. This increased voltage proportional to torque load is thus added to the reference voltage $V_{Ref}$. The proportion used is adjusted by $RV_2$ to counteract exactly the drop in motor speed which would otherwise have occurred with increasing load.

Although a saw-tooth waveform is preferred it will be appreciated that other waveforms having suitable positive- and negative-going ramps could be employed.

The control circuit and method of the invention are capable of reducing the current drain on the battery of a portable medical monitoring tape recorder (with a motor running at a speed of 7 rps) from between 15 and 20 mA to around 4 mA making it possible to employ a readily available 9 v battery in place of the expensive mercury batteries used heretofore.

Figure 4:
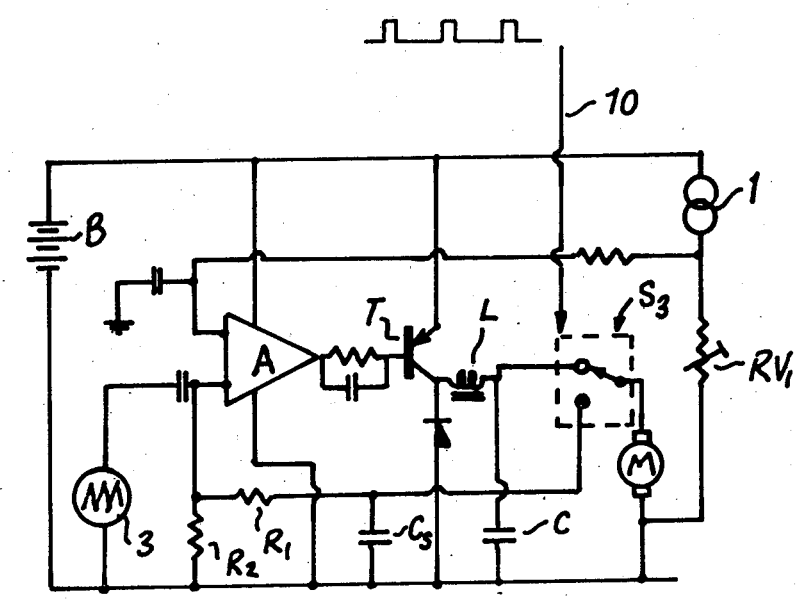
FIG. 4 is a modified form of circuit similar to that of FIG. 2.

In an alternative arrangement (shown in FIG. 4) the speed dependent feedback voltage is obtained by periodically disconnecting the motor M from the supplying inductor L and connecting it instead to a storage capacitor $C_s$ which aquires from the (free wheeling) motor M, a sample of the speed-dependent back emf of the motor. The periodically updated stored sample voltage is used to provide the feedback voltage $V_M$, a proportion $kVm$ of which is fed to the positive terminal of the amplifier A. An electronic changeover switch $S_3$, operated by a train of sampling pulses fed to a line 10 at a frequency of a few hundred hertz and a low on/off ratio, is used to effect this sampling action. The storage capacitor $C_s$ is connected in parallel with the resistor $R_2$ between the changeover switch $S_3$ and the resistor $R_1$, and an additional capacitor C is provided to receive the output from the inductor L during the sampling of pulses when the motor M is disconnected from the inductor L. In the alternative arrangement of FIG. 4, $RV_2$ is dispensed with.

The invention is also expected to find application in reducing battery drain in the case of portable musical tape replaying and/or dictation machines.

What is claimed is:

1. In a method of energising a DC electric motor having an armature winding and a commutator therefor, which comprises feeding electrical power to a series connection of an inductor and the armature of the motor in unidirectional current pulses at a repetition rate which is large compared to the in-use commutation rate prevailing in the armature winding of the motor, and maintaining current flow in the same direction through said armature winding during the intervals between said pulses, the ratio between the pulse and interval widths being controlled so that the time average voltage applied to the armature winding over many pulses is made equal to the desired motor voltage, the improvement which comprises
   (a) generating an operator-variable first reference voltage,
   (b) generating a voltage representing at least a proportion of the motor voltage,
   (c) superimposing on said generated proportion of the motor voltage a waveform having a repetition rate which is at least several hundred times the commutation rate prevailing in the armature winding of the motor and having negative- and positive-going ramps, to produce a second reference voltage,
   (d) feeding said first and second reference voltages to input terminals of a voltage comparing means, and
   (e) generating the current pulses fed to the armature winding via an electronic circuit which includes said voltage comparing means, to effect a switching of the current to the motor each time said second reference voltage traverses said first reference voltage.

2. A method as claimed in claim 1, in which the waveform forming a part of the second reference voltage is a saw-tooth waveform of a frequency of a few tens of kilohertz.

3. A method as claimed in claim 1, in which the voltage comparing means is a differential amplifier.

4. A method as claimed in claim 2, in which the voltage comparing means is a differential amplifier.

5. A method as claimed in claim 1, in which the first reference voltage is obtained from a resistor network fed by a reference current and including a first variable resistor settable by an operator to set the speed of the motor and a second variable resistor in series with the motor.

6. A DC motor control system comprising
   a DC electric motor having an armature winding and a commutator therefor,
   terminal means for feeding electrical power from a battery connected thereto to the motor,
   transistor switch means in the power supply from the terminal means to the motor,
   an inductor in series with the armature winding of the motor in a current loop,
   means in the loop to maintain current flow therearound when said switch means is open, and
   a control circuit for said switch means which opens and closes the latter repetitively at a rate which is large compared to the in-use commutation rate prevailing in the armature winding of the motor, characterised in that said control circuit includes
   first means to generate a first reference voltage,
   voltage dividing means to generate a base for a second reference voltage which base is proportionally related to the voltage appearing across the motor,
   a waveform generator generating a waveform having a repetition rate which is at least several hundred times the commutation rate of the motor and both negative- and positive-going ramps,
   means to add the base to the waveform to generate the second reference voltage, and
   means to compare the first and second reference voltages and to switch current to the motor when said second reference voltage drops below said first reference voltage.

7. A control system as claimed in claim 6, in which said first reference voltage includes a voltage component which increases with increasing motor current.

8. A control system as claimed in claim 6, in which said means to compare the first and second reference voltages is a differential amplifier.

9. A control system as claimed in claim 7, in which said means to compare the first and second reference voltages is a differential amplifier.

10. A control system as claimed in claim 6, in which said waveform generator is a saw-tooth generator operating at least at ten thousand times the commutation rate of the motor.

* * * * *